United States Patent
Song et al.

(10) Patent No.: US 10,534,863 B2
(45) Date of Patent: Jan. 14, 2020

(54) SYSTEMS AND METHODS FOR AUTOMATIC SEMANTIC TOKEN TAGGING

(71) Applicant: Thomson Reuters Global Resources Unlimited Company, Baar (CH)

(72) Inventors: Dezhao Song, Eagan, MN (US); Frank Schilder, Saint Paul, MN (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 0 days.

(21) Appl. No.: 15/889,947

(22) Filed: Feb. 6, 2018

(65) Prior Publication Data
US 2018/0225281 A1    Aug. 9, 2018

Related U.S. Application Data

(60) Provisional application No. 62/455,082, filed on Feb. 6, 2017.

(51) Int. Cl.
| | | |
|---|---|---|
| G10L 15/00 | (2013.01) | |
| G10L 15/14 | (2006.01) | |
| G06F 17/27 | (2006.01) | |
| G06N 5/02 | (2006.01) | |

(52) U.S. Cl.
CPC ........ G06F 17/2785 (2013.01); G06F 17/274 (2013.01); G06F 17/277 (2013.01); G06F 17/278 (2013.01); G06N 5/02 (2013.01)

(58) Field of Classification Search
CPC .... G06F 17/274; G06F 17/277; G06F 17/278; G06F 17/2785; G06N 5/02
USPC ................................. 704/9, 231, 256.2, 256.3
See application file for complete search history.

(56) References Cited

U.S. PATENT DOCUMENTS

| | | | | |
|---|---|---|---|---|
| 2003/0069880 | A1* | 4/2003 | Harrison | G06F 16/3334 |
| 2006/0100855 | A1* | 5/2006 | Rozen | G06F 17/279 |
| | | | | 704/9 |
| 2008/0263019 | A1* | 10/2008 | Harrison | G06F 16/3334 |
| 2009/0281970 | A1* | 11/2009 | Mika | G06F 17/241 |
| | | | | 706/12 |
| 2013/0018692 | A1* | 1/2013 | Guo | G06F 11/008 |
| | | | | 705/7.25 |
| 2016/0147943 | A1 | 5/2016 | Ash et al. | |
| 2016/0239758 | A1* | 8/2016 | Jeong | G06F 16/951 |
| 2016/0350283 | A1 | 12/2016 | Carus et al. | |
| 2016/0357851 | A1 | 12/2016 | Perkins et al. | |
| 2018/0225281 | A1* | 8/2018 | Song | G06F 17/2785 |

OTHER PUBLICATIONS

International Search Report and Written Opinion from related International Patent Application No. PCT/US2018/017083 dated Apr. 6, 2018.

\* cited by examiner

*Primary Examiner* — Khai N. Nguyen
(74) *Attorney, Agent, or Firm* — McCarter & English, LLP; Sean R. MacDavitt

(57) ABSTRACT

A computing system can receive a request to apply semantic token tagging on a specified domain, and can retrieve a set of data associated with the specified domain from a data storage facility. Canonical sequences can be formed from strings included in the data set. Each canonical sequence can be permutated to form sequence variations and each sequence variation can be verified against a generalized domain. Semantic token tagging can be applied to the specified domain using a subset of the sequence variations that are successfully verified as training data.

21 Claims, 6 Drawing Sheets

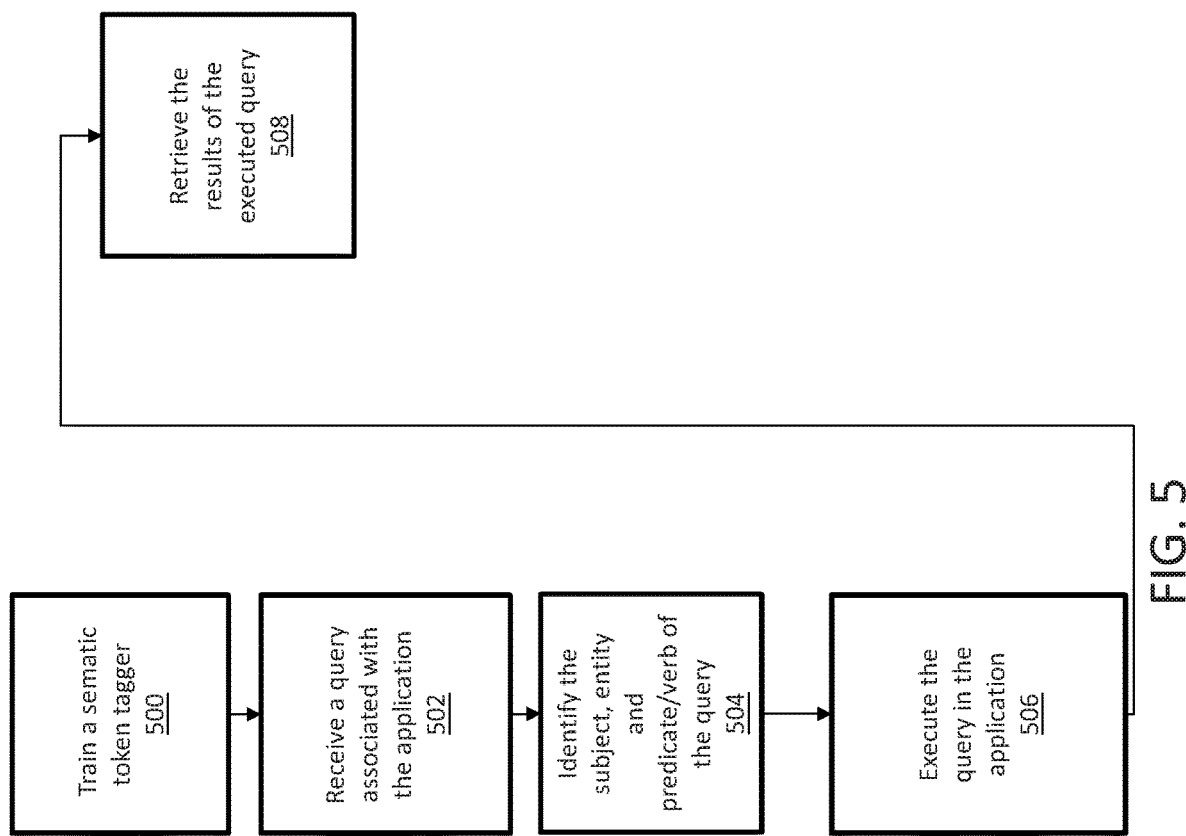

SYSTEMS AND METHODS FOR AUTOMATIC SEMANTIC TOKEN TAGGING

CROSS-REFERENCE TO RELATED PATENT APPLICATIONS

This application claims priority to U.S. Provisional Application No. 62/455,082 filed on Feb. 6, 2017, the content of which is hereby incorporated by reference in its entirety.

BACKGROUND

Various sequence tagging approaches have been proposed over the course of the recent decades. Such approaches range from tagging tokens with Part-of-Speech (POS) tags to tagging tokens with supertags encoding complex grammatical relations. Conventional tagging approaches can typically be categorized in two dimensions: (a) domain specificity and (b) complexity of the encoded semantic information.

The task of POS tagging is defined as providing categories for each token with grammatical tags according to their syntactic function in a sentence. Accordingly, this tagging task is very much domain independent and no semantic information is encoded. State-of-the-art POS tagging systems can include those based on Maximum Entropy models and deep learning architectures, such as LSTM. However, deploying available POS tagging systems as off-the-shelf solutions often results in a significant performance drop. To compensate for such decreases in performance, domain adaption approaches have been proposed to achieve decent performance for POS tagging across different domains.

One example of encoding tags with complex grammatical relationships can be the task of Semantic Role Labeling (SRL). The task of SRL goes beyond syntactic labels by adding semantic information such as AGENT or RESULT based on thematic roles. Automatic approaches to SRL have been developed over the last few decades, including some recent approaches that adopt neural network architectures.

Natural language processing (NLP) applications typically utilize various tagging approaches to facilitate interactions between users and machines. For example, NLP applications can provide an interface between users and machines to allow users to interact with the machines in the users' natural language, where the machines rely on tagged data to understand, interpret, and/or predict what the natural language input means and/or what actions the users want the machines to take. For example, NLP applications can provide an interface between a user and an information retrieval system. In such applications, the information retrieval system retrieves data from its underlying inverted index in response to requests from users. Using NLP, a user's input can be structured according to the user's natural language or way of speaking. To ensure that the information retrieval system retrieves the most appropriate, most relevant, most meaningful, and/or accurate data, the user's natural language input must be properly construed by the NLP application for the information retrieval system. Thus, improvements to the tagging utilized by the NLP applications can result in improvements to the ability of the NLP application and the information retrieval system to retrieve the most appropriate, most relevant, and/or most meaningful data in response to the user's natural language input.

SUMMARY

Embodiments of the systems and methods of the present disclosure provide a novel approach to domain-specific semantic token tagging by employing semantically rich labels that go beyond purely syntactic labels, such as Part-of-Speech (POS) tags, that typically do not capture domain-dependent semantic information. For example, prepositions (e.g., by) could carry different semantic meanings in different contexts (e.g., cases by Justice Scalia vs. cases by Olivia Rose (a phone case designer)). These semantically rich labels are essential for developing complex and enhanced natural language processing (NLP) applications, such as question answering, summarization or information extraction systems, information retrieval systems, and user-machine interfaces for artificial intelligence applications. Additionally, training the machine learning models that rely on these semantically rich labels requires a large quantity of annotated resources (gold data). The task of preparing such annotated resources can be a labor and resource intensive process, often requiring tedious and time-consuming steps.

Embodiments of the systems and methods of the present disclosure overcome the gold data bottleneck problem that plagues many NLP applications by automatically creating training data in order to avoid the resource intensive annotation efforts. Embodiments of the systems and methods can take advantage of structured data as in knowledge graphs capturing linked data set, such as DBpedia. Additionally, after the training data is automatically created by embodiments of the present disclosure, embodiments of the present disclosure can utilize the training data to train the machine learning models for NLP applications to improve and enhance the accuracy of the NLP applications to provide a robust natural language interface between users and machines.

By using a knowledge graph, embodiments of the systems and methods of the present disclosure can first derive canonical sentences that are constructed from the entities and their relations. As one non-limiting example, a table of legal cases and judges in a relational database can produce canonical descriptions as in cases decided by Justice Antonin Scalia. Next, embodiments of the systems and methods of the present disclosure can autonomously create a large amount of sequence variations by permutating the canonical sequences. Subsequent to the creation of the sequence variations, a language model that is trained on a general-purpose English text corpus can be employed as a filter in order to retain only high-quality sequence variations, i.e., the training sentences/data. Such filtered data can be used to train various neural network models for token tagging.

In accordance with embodiments of the present disclosure, a computing system can receive a request to apply semantic token tagging on a specified domain. The computing system can retrieve a set of data associated with the specified domain from a data storage facility. The set of data can include strings (e.g., text strings). The set of strings are generated using a knowledge graph associated with the specified domain. The computing system can form canonical sequences based on the strings and each canonical sequence can be permutated to form sequence variations. The computing system can verify each sequence variation against an external domain (e.g., a large-scale text corpus). The computing system can eliminate a set of sequence variations, in response to failing to verify the set of sequence variations against the external domain, resulting in a subset of sequence variations. The computing system can then train a token tagger by using the subset of sequence variations as training data.

Each of the canonical sequences can include a subject, a predicate or verb, and an entity. Each of the canonical sequences can be made up of segments, and the computing system can be configured to execute in-segment transformations on each of the segments to generate permutations of each segment. The computing system can be further configured to form the plurality of sequence variations by permutating the one or more canonical sequences across the plurality of segments of the one or more canonical sequences based on the plurality of permutations.

The computing system can be configured to perform Part-of-Speech (POS) tagging on the domain and to build a language model based on the POS tags, and each sequence variation can be verified against the external domain, by applying the language model on each sequence variation.

A machine learning architecture can be used to train a token tagger (a machine learning model) and then apply the tagger to perform semantic token tagging. The machine learning architecture can include one or more of Maximum Entropy (MaxEnt), Conditional Random Fields (CRF), Long Short Term Memory (LSTM), Gated Recurrent Unit (GRU), and Convolutional Neural Network (CNN).

BRIEF DESCRIPTION OF DRAWINGS

The accompanying figures, which are incorporated in and constitute a part of this specification, illustrate one or more embodiments of the present disclosure and, together with the description, help to explain embodiments of the present disclosure. The embodiments are illustrated by way of example and should not be construed to limit the present invention. In the figures:

FIG. 5 is a flowchart illustrating an exemplary process performed in an embodiment of the automated semantic token tagging system.

DETAILED DESCRIPTION

Described herein are embodiments of systems and associated methods for automated semantic token tagging and natural language processing applications based on the automated semantic token tagging. A computing system can receive a request to apply semantic token tagging on a specified domain. The computing system can retrieve a set of data associated with the specified domain from a data storage facility. The set of data can include strings (e.g., text strings). Using the strings, the computing system can form canonical sequences, and can permutate each canonical sequence to form sequence variations. The computing system can verify each sequence variation against a generalized, external domain, such as Wikipedia. The computing system can eliminate a set of sequence variations, in response to failing to verify the set of sequence variations against the external domain, resulting in a subset of sequence variations. The computing system can train a token tagger (a machine learning model) by using the subset of sequence variations as training data and apply the token tagger to support and benefit downstream NLP applications, such as question answering systems.

The system can automatically use the generated training data for training a semantic token tagger. By utilizing a knowledge graph and minimal human input, the system can generate canonical token sequences. The system can transform such canonical sequences into its all possible variations in order to cover possible ways of representing their semantics. In order to retain only the high-quality sequence variations, the system can filter the transformed variations using a language model that is built on the POS tags of text from a generalized domain, such as Wikipedia documents. By using word embeddings (that are trained on a generalized domain) as features, the system can train a neural network based semantic token tagger on such filtered sequence variations. Experimental embodiments of the system of the present disclosure demonstrate that a Weighted F1 score of approximately 0.80 can be achieved.

Figure 1:
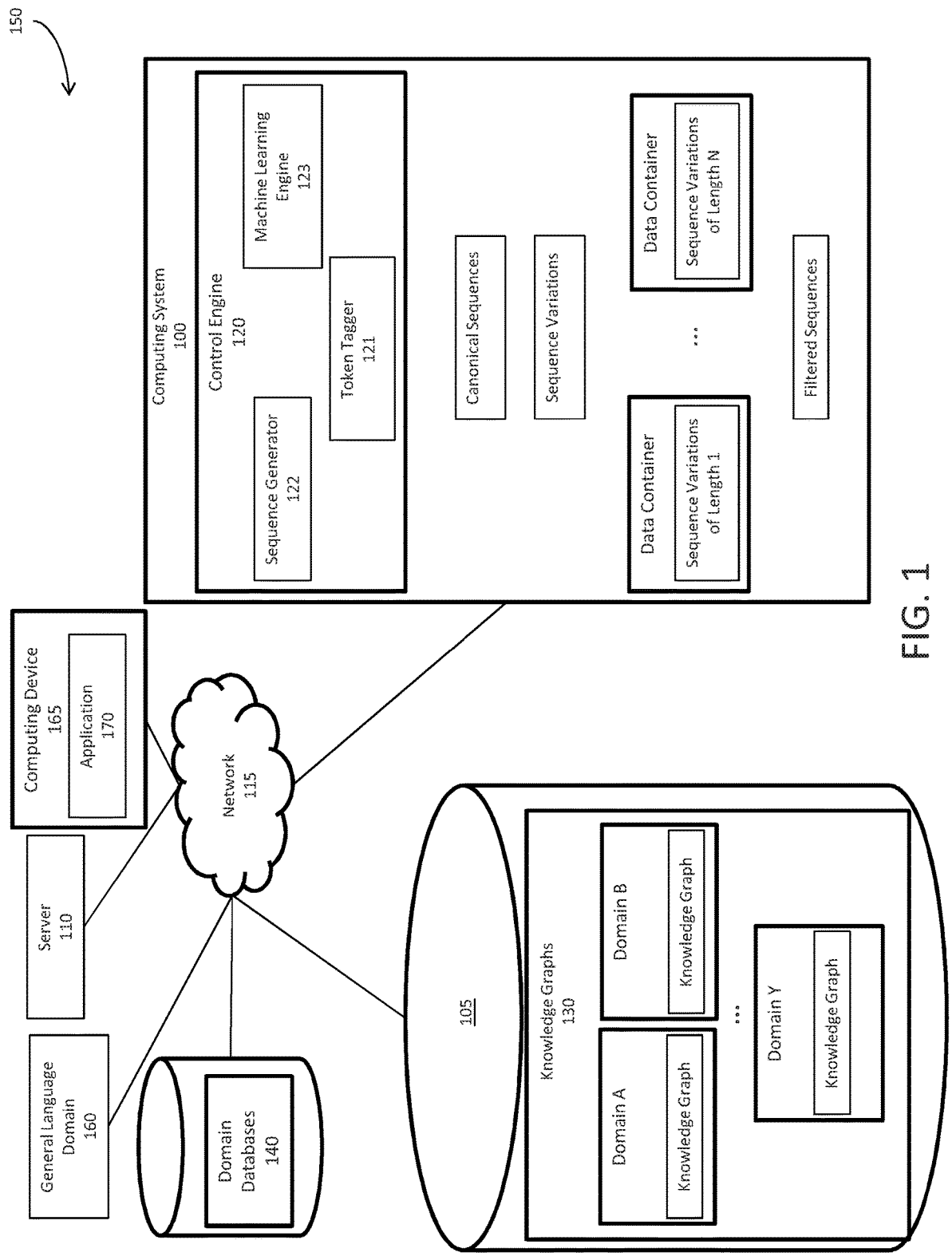
FIG. 1 is a block diagram of an automatic semantic token tagging system according to an exemplary embodiment.

FIG. 1 illustrates an exemplary automatic semantic tagging system 150. The automatic systematic tagging system 150 can include one or more computing systems 100, one or more databases 105, one or more servers 110, one or more external domains 160, one or more and computing devices 165. In one exemplary embodiment, the computing system 100 can be in communication with the database(s) 105, the domains 160, and the computing devices 165, via a communications network 115. An application 170 can reside on the computing device 165. The application can be an NLP application. The computing system 100 can execute a control engine 120. The control engine 120 can include components such as, a token tagger 121 and a sequence generator 122 and a machine learning engine 123. The control engine 120 can implement the automatic semantic tagging system 150 using the token tagger 121, sequence generator 122 and machine learning engine 123.

In an example embodiment, one or more portions of the communications network 115, can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The computing system 100 may include one or more computers or processors configured to communicate with the database(s) 105, the general/external domains 160, and computing devices 165 via the network 115. The computing system 100 may host one or more applications configured to interact with one or more component of the automatic semantic tagging system 150 and/or to facilitate access to the content of the databases 105. The databases 105 may store information/data, as described herein. For example, the databases 105 can include a knowledge graphs database 130. The knowledge graphs database 130 can store knowledge graphs for various domains (e.g., Domain A, Domain Y, etc.). The knowledge graphs can contain semantically tagged data (i.e., entities and their relationships). The databases 105 can be located at one or more geographically distributed locations from each other or from the computing system 100. Alternatively, the databases 105 can be included within the computing system 100. One or more domain databases 140 can include sets of data made up of strings associated with one or more domains. The domain databases 140 can be utilized by the applications 170 to retrieve data in response to query requests.

In an exemplary embodiment, the computing system 100 can execute the control engine 120. The control engine 120 can receive a request to generate training data for building a semantic token tagger on a specified domain. The request can include the specified domain, for example a uniform resource identifier (URI) or a uniform resource location (URL). In response to receiving the request, the control engine 120 can retrieve a knowledge graph for the specified domain from the knowledge graphs database 130. The control engine 120 can query the knowledge graphs database 130 in order to retrieve sets of data. The sets of data can be made up of strings of alphanumeric characters. The strings can include subjects, predicates/verbs and entities.

As a non-limiting example, a knowledge graph can contain data associated with a domain specific to legal documents (e.g., court decisions, administrative agency decisions, regulations, laws, hearings, etc.). In the present example, the legal domain can include 1.2 million entities of various types, such as Judge, Attorney, Company, Law Firm, Jurisdiction and Court. Seven major predicates, including "presided over by" (between a legal case and a judge), "tried in" (between a legal case and a court or jurisdiction), "involving" (between a legal case and a company or an individual), etc., can be defined for the legal domain. For each predicate, the control engine 120 can provide different verbalizations. For instance, for the predicate between "legal case" and "judge entities", the control engine 120 can provide the following verbalizations "presided over by", "judged by" and "decided by". In this example, one concrete canonical sequence can be "Legal cases|presided over by|Judge John Smith", where "|" is used to separate different sequence segments. Each verbalization can be embodied as a canonical sequence.

In order to generate the training data for token tagging by the computing system 100, given a canonical sequence q, the sequence generator 122 can transform the canonical sequence q to generate its possible variations. For example, the canonical sequence can have the following format $<t, p_1, e_1, p_2, e_2, \ldots p_n, e_n>$, where t represents a subject of a domain (e.g., "Legal Cases", "companies" or "patents"), p represents predicate/verb (i.e., a relation in the knowledge graph, such as "presided over by", "headquartered in" and "granted to"), and e can represent a specific entity (e.g., "Judge John Smith", "United States" or "Google"). The canonical sequence can be formed from sequence segments t, p and e. Given a canonical sequence, e.g., "Legal cases presided over by Judge John Smith", the control engine 120 can generate variations, such as "John Smith cases" or "cases by John Smith", in order to capture other possible ways of expressing the same semantics as the canonical sequence.

The sequence generator 122 can perform in-segment transformations for each segment of a canonical sequence. For each segment s, the sequence generator 122 can generate its permutations as follows: $SP_s = \bigcap_{k=1}^{|s|} \text{Permutate}(W_k)$, where |s| is the number of words in segment s and $W_k$ represents k ($k \in [1, |s|]$) words selected from all words in s.

Subsequently, the sequence generator 122 can permutate q across its segments $QP = I_{l=1}^{|q|}, \text{Permutate}(<SP_{s_1} \ldots SP_{s_j}>)$, where |q| is the number of segments in sequence q. For sequence q, the sequence generator 122 can generate all its permutations (QP) by using 1 to |q| segments and for each of such permutations qp∈QP, the Cartesian product of the permutations of each segment included in qp can be calculated resulting in all the possible sequence variations of the canonical sequence A probability score of a particular sequence variation can partly depend on its length (in terms of number of words), and the sequence generator 122 may not compare the scores across sequence variations of different lengths. The sequence generator 122 can group the sequence variations into various data containers, where variations in each data container is of the same length in terms of number of words. For each data container, the sequence generator 122 can apply the language model to the sequence variations in each of the data containers, calculate all distinct scores, and identify sequence variations for which the probability score from the language model is more than a specified threshold (i.e., top 5% (θ in Algorithm 1 below) of highest scores within a data container).

The sequence generator 122 can filter out some of the sequence variations of the canonical sequence, which are not likely used by humans. For example, both "John Smith cases" and "cases presided by John Smith" can be more frequently used than the variation "cases John Smith". The variations can be filtered using a language model that is built based on a generalized, external domain 160. As a non-limiting example, the generalized, external domain can be the English version of Wikipedia. However, Wikipedia is a general corpus, it may not contain the word sequences (i.e., the sequence variations), which may result in low probability for many sequence variations. The control engine 120 can perform Part-of-Speech (POS) tagging on the entire Wikipedia corpus and build the language model on such POS tags. The control engine 120 can identify filtered sequence variations as training data to train a semantic token tagger.

As a non-limiting example, the following Algorithm 1 can be used to generate training data.

---

Algorithm 1

Algorithm 1 Data Generation (KG, PV, LM, k, θ), KG represents a knowledge graph (a set of generic types, predicates, and entities); PV is manually provided verbalizations for predicates in KG; LM is the language model for filtering sequence variations; k is the number of entities use per entity type; θ is the threshold for our language model-based filtering

---

1: S ← θ, SV θ θ
2: T ← GetEntityTypes(KG)
3: for all t ∈ T do
4:     $P_t$ ← GetPredicates(KG, t)
5:     for all p ∈ $P_t$ do
6:         $E_{tp}$ ← GetEntities(KG, t, p, k)
7:         for all e ∈ $E_{tp}$ do
8:             S = S $\bigcup_{v \in PV(p)}$ <t, v, k>
9: SV ← Transform(S)
10: ValidSV ← Filter (SV, LM, θ)
11: return ValidSV

---

With reference to Algorithm 1, in Lines 3 to 8, given an entity type t E T, k entities ($E_{tp}$) for each predicate p∈$P_t$ of t, can be found. The tuples of <t, v∈PV(p), e∈$E_{tp}$> can be called the canonical sequences. Next, at Line 9, each of the canonical sequences can be transformed into all possible variations. Finally, at Line 10, transformed sequence variations can be filtered using a language model, and all sequence variations whose probability from the language model is above a certain threshold can be used as training data.

The machine learning engine 123 can train a token tagger 121 using the generated training data. The token tagger 121 can be a semantic token tagger, implemented to support a robust parsing of questions in a question answer system. In one example, the training data can be used to train a semantic token tagger to support robust parsing of questions in a question answering system. The semantic token tagger trained on the training data can be used to classify each token in a question. The class (e.g., topic, court) can be used by a parsing system. In another example, the semantic token tagger trained on the training data can be used to improve information extraction systems. Tagged tokens can be used for extractions of named entities/templates from text where limited annotated data is available.

As an example, the token tagger 121 (trained based on the automatically generated training data) can be used by an NLP-based application 170 associated of a specified domain by semantically tagging each subject, entity, and predicate/verb of a data set of that domain. The application 170 can receive a request for data to be retrieved from the domain. The request can be received in a user's natural language and can include, for example, a subject, an entity and a predicate/verb. The application 170 can identify the subject, entity and predicate/verb of the request based on the semantic token tagging results from the token tagger that is trained on the training data of this domain. The application 170 can convert the natural language request to one or more queries which can be executed in the application based on the identified subject, entity and predicate/verb. The application 170 can retrieve the results of the executed queries and return the results to the user.

By automatically generating training data as described herein, the computing system 100 overcomes problems that plague many NLP applications. The training data can subsequently be used to train machine learning models and the machine learning models can be utilized by NLP applications (e.g., a robust natural language interface between users and machines, to improve their accuracy and usability). Generating the semantically rich labels as described herein is essential for developing complex and enhanced natural language processing (NLP) applications, such as question answering, summarization or information extraction systems, information retrieval systems, and user-machine interfaces for artificial intelligence applications.

The application 170 can be implemented by one or more servers and one or more databases, which can communicate directly with each other and/or may communicate with each other via one or more communication networks. Users devices can interact with the application 170 for information retrieval purposes. The user devices can be computing devices (including a personal computer, a workstation, a tablet, a smart phone, a laptop, a server, and the like configured to communicate with the application 170 over one or more communication networks using one or more communication protocol.

The user devices can include an executable, such as a web browser or a stand-alone application specific to the application 170, which can be executed by the user devices (e.g., by a processing device) to render one or more graphical user interfaces (GUIs) on a display device associated with each of the user devices. The GUIs displayed to users can include data entry areas to receive information from the user; user-selectable elements or areas that can be selected by the user to cause the application 170 to perform one or more operations, functions, and/or processes; and/or can include data outputs to display information to users. In exemplary embodiments, the GUIs can enable navigation and/or traversal of the application 170 in response to receiving user requests. The user can input the requests on the GUI in the user's natural language.

In exemplary embodiments, the domain databases 140 that can be searched in response to the search requests and can include one or more source databases. Exemplary embodiments of the domain databases 140 can include works (written or otherwise), bibliographic and citation information, and/or information. In some embodiments, the domain databases 140 can include content that relates to legal, research, financial, as well as any other suitable content. As one non-limiting example, the databases can include content associated with legal articles and/or decisions that are published by one or more publishers. While exemplary embodiments of the databases may be described herein with respect to written works (e.g., legal decisions), those skilled in the art will recognize that exemplary embodiments are not limited to databases associated with written works.

The domain databases 140 can store one or more works that can be retrieved in response to one or more operations of the application 170 based on, for example, natural language inputs that are interpreted by the NLP-based application 170 by utilizing the token tagger 121 trained with the automatically generated training data by the machine learning engine 123. The natural language inputs can be tagged by the token tagger 121 that is trained by the machine learning engine 123 by using the automatically generated training data. In exemplary embodiments, the domain databases 140 can be included in the application 170 and/or can be internal or external to the application 170. In exemplary embodiments, the works stored in the source databases can include written works related to legal, research, financial, etc.

Figure 2A:
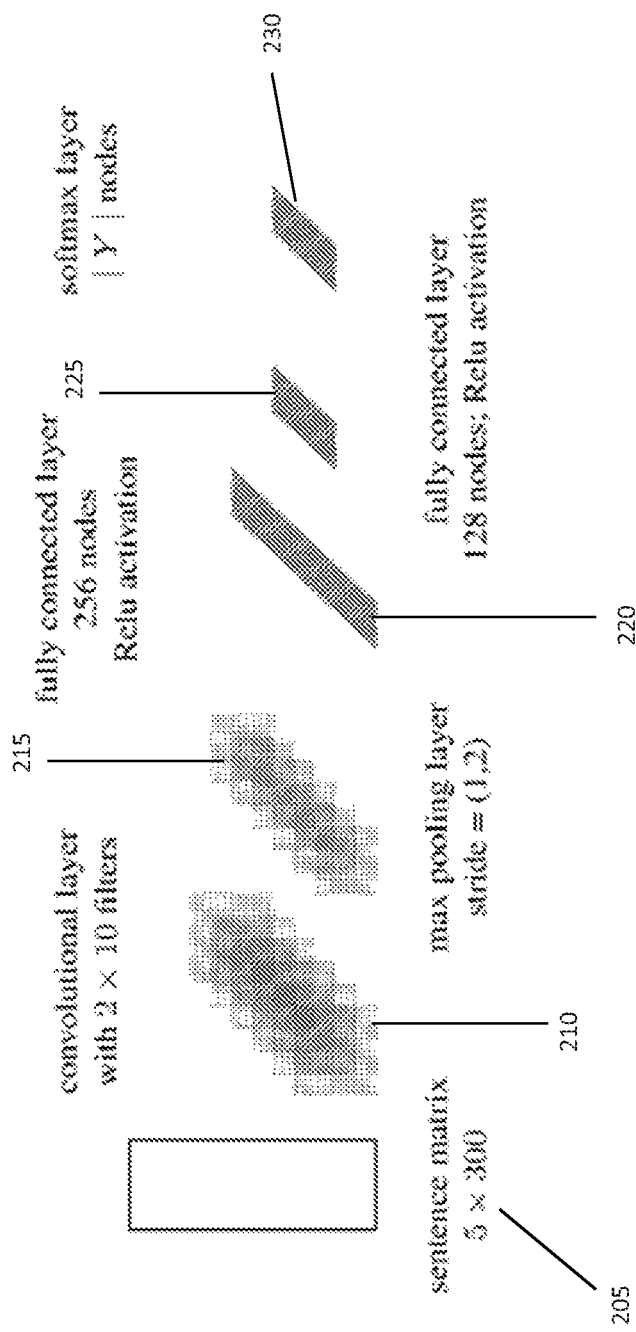
FIGS. 2A-B illustrate architecture of neural networks implementing semantic token tagging in accordance with an exemplary embodiment.
Figure 2B:
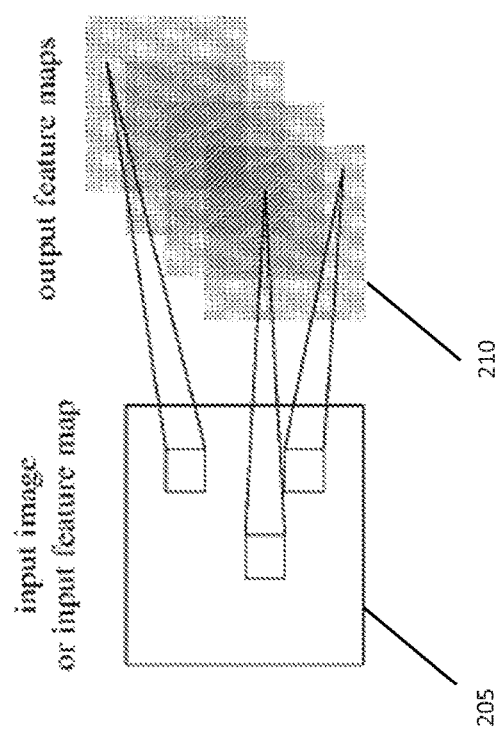

FIGS. 2A-B illustrate architecture of neural networks implementing the token tagger in accordance with an exemplary embodiment. Different machine learning approaches can be used for building the token tagger using the generated training data as described above. For example, conditional probability approaches, such as Maximum Entropy and Conditional Random Fields, can be adopted to implement token tagging. Additionally, neural networks, including Convolutional Neural Network (CNN), Long Short Term Memory (LSTM) and Gated Recurrent Units (GRU), can also be used to implement token tagging.

As an example, Maximum Entropy (MaxEnt) can be used for token tagging. A sequence tagging problem can be described as finding the optimal sequence $Y=\{y_i, \ldots y_n\}$ for a given input sequence $X=\{x_1, \ldots x_n\}$. A MaxEnt classifier can be used for finding the most likely sequence of labels given the evidence from the training data. Maximizing the entropy H $(p)=-Ep(x, y)\log p(x, y)$ can provide a model where for a given sequence X the labeling sequence Y is chosen. Maximum Entropy models rely on a set of feature functions $fi$ applied to the training data (e.g., the current word $x_i$ is "the" and t=DT) in order to capture the context of the words and the maximum entropy estimate is based on the training data assuming that the test data stems from the same distribution.

In another example, Conditional Random Fields (CRF) can be used for token tagging. CRF provides a solution to a label bias problem, that the labels in a given state only compete against other labels reachable from that state. Taking the sequence information into account normally improves the performance of the tagging system because information of the tag of the previous token is taken into account as well. Given an input sequence of tokens X and the corresponding labels described by Y, a set of feature function $f$ similar to the function defined for an MaxEnt approach is defined. By restricting the feature to depend only on the current or the previous label, a linear-chain CRF is created. Scores for a feature function can be derived by $$\text{score}(Y \mid X) = \sum_{j=1}^{m} \sum_{i=1}^{n} \lambda_j f_j(X, i, y_i, y_{i-1}),$$

where $\lambda$ is a set of weights leading to the definition of probabilities:

$$p(Y|X) = \frac{\exp(\text{score}(Y|X))}{\sum_{Y'} \exp(\text{score}(Y'|X))} \quad (1)$$

As mentioned above, neural networks can also implement token tagging. While CRF and MaxEnt approaches rely on discrete feature functions, the neural network approaches expect word embeddings as input. Word embeddings are high dimensional representations of words derived from a large text corpus leading to a n×m input sentence matrix where n is the maximal length of input sentences in the training data and m is the dimension of the word embeddings (m could vary based upon different domains). The neural network based approaches differ in respect to the network architecture and how the neurons are defined.

As an example, Convolutional Neural Network (CNN) can be used for text processing task because the convolutions can be applied to 2-dimensional sentence matrix created from the word embeddings. With reference to FIG. 2A, three different layers that define a CNN: (a) convolutional layers 210, (b) pooling layers 215, and (c) fully-connected layers 220, 225. Turning to FIG. 2B, the convolution layer 210 is basically a filter that is run over the sentence matrix 205. The convolution layer 210 can be embodied as output feature maps and the sentence matrix 205 can be embodied as input image or input feature maps. Turning back to FIG. 2A, certain parameters define the convolutions, such as lengths and widths of the filter and the stride indicating how fast the filter moves over the input matrix. The pooling layers 215 is a form of non-linear down-sampling where the input matrix is divided up in non-overlapping rectangles and a specified value is added to the pooling layer 215. As a non-limiting example, the specified value can be the maximum value of each sub-matrix (i.e., MaxPooling), an average value of each sub-matrix (i.e., Average Pooling), or another value associated with each sub-matrix. Eventually, fully connected layers are added such in a standard neural network.

As a non-limiting example, n=5 and =300 for the dimensions of the input matrix (e.g., sentence matrix 205 as shown in FIG. 2A) and one convolutional layer 210 using eight 2×10 filters with strides of (1, 2) for the max pooling layer 215. The pooling size was (2, 2). After the pooling layer 215, two dense layers were connected with 256 and 128 nodes 220 and 225, respectively, before a softmax layer 230 determines the output vector of this architecture.

As another example, Long Short Term Memory (LSTM) can be used to implement token tagging. LSTM uses a gating mechanism in hidden states that remembers states. Hidden states in an Recurrent Neural Network (RNN) are defined by $h_t = \tan h(W_{x_t} + U_{h_{t-1}} + b)$, where $x_t$ is the input vector to the unit at step t and $h_{t-1}$ the pervious hidden state. LSTM adds a number of gates to this unit by introducing a series of equations:

$i_t = \sigma(W^{(i)}x_t + U^{(i)}h_{t-1} + b^{(i)})$ $f_t = \sigma(W^{(f)}x_t + U^{(f)}h_{t-1} + b^{(f)})$ $o_t = \sigma(W^{(o)}x_t + U^{(o)}h_{t-1} + b^{(o)})$ $u_t = \tan h(W^{(u)}x_t + U^{(u)}h_{t-1} + b^{(u)})$ $c_t = i_t \otimes u_t + f_t \otimes c_{t-1}$ $h_t = o_t \otimes \tan h(c_t) \quad (2)$ The input gate $i_t$ determines how much of the unit is updated, the forget gate $f_t$ controls how much of the unit forgets, the output gate $o_t$ overlooks how much of the internal state is exposed to the next state, and $u_t$ is the candidate gate similar to equation defined for an RNN. The value of the memory cell $c_t$ is composed from the element-wise multiplication of the input gate and the candidate gate added to the multiplication of the forget gate with memory cell of the previous step. The hidden state is defined as the multiplication of the output gate and the memory cell applied to the hyperbolic tangent function. The architecture of LSTM can be defined as a stack of LSTM layers with each layer having different number of nodes and a final softmax layer.

As another example, Gated Recurrent Unit (GRU) can be used to implement token tagging. Similar to an LSTM unit, the GRU unit has gates to control what is passed through the hidden states. The GRU unit can have two states: a reset gate $r_t$ and an update gate $z_t$. GRUs do not have an internal memory ($c_t$) and do not have an output gate $o_t$. Instead the two gates determine how the input are combined with the previous memory and the update gate determines how much is passed on.

$r_t = \sigma(W^{(r)}x_t + U^{(r)}h_{t-1} + b^{(r)})$ $z_t = (W^{(z)}x_t + U^{(z)}h_{t-1} + b^{(z)})$ $u_t = \tan h((h_{t-1}) \otimes r_t)W^{(u)}x_t + U^{(u)}h_{t-1} + b^{(u)})$ $h_t = (1-z_t) \otimes u_t + z_t \otimes h_{t-1} \quad (3)$ The architecture of the GRU model can contain a stack of GRU layers with each layer having different number of nodes and a final softmax layer.

As a non-limiting example, the automatic token tagging system can be applied to a Legal Question Answering (LegalQA) dataset. To illustrate the implementation of the disclosed system, disclosed experimental embodiment of the system was developed, in which a dataset was composed of about 5,000 natural language questions that can represent questions used for a Legal Question Answering system that leverages an information retrieval system. From these 5,000 questions, the experiment focused on 100 questions of various length, which were randomly selected. The tokens in each of the 100 questions can be annotated with selected labels. (e.g., labeling a token as (part of) a judge name, (part of) an attorney name, or (part of) a company name). The 100 questions that were annotated consisted of 1,116 tokens.

Continuing with the aforementioned experiment, a Legal Knowledge Graph (LegalKG) was used, which includes the following major types of entities: Judge, Attorney, Company, Law Firm, Jurisdiction, Court and Legal Topic. The LegalKG was used for automatically generating training data, which can be used to train token taggers to improve retrieval and response to natural language inquiries. In the experiment, the LegalKG included seven major relationships between these entities, including "Attorney represents a Company", "Case is tried in a Jurisdiction", "Company is involved in a Legal Case", etc. In this experiment, up to 100 (k in Algorithm 1) entities of each type were randomly selected and all the seven relationships were used for training data generation.

For neural network architectures, word embedding vectors can be used as features. Continuing with the aforementioned experiment, an English Wikipedia data set (i.e., a general domain) was downloaded, the contents from the ARTICLEs (one of the document types from Wikipedia) were extracted, and a series of preprocessing techniques were applied to the documents. For example, preprocessing techniques, including lowercasing (changing all text to lower case text), removing contents in brackets, and removing empty lines, were performed. The word embedding vectors were trained on the pre-processed data using, for example word2vec from Google, Inc.

As discussed herein, during training data generation, a language model can be adopted for filtering the transformed sequence variations. Given the above preprocessed Wikipedia corpus, sentence splitting and POS tagging were executed by using the CoreNLP system from Stanford University. In this experiment, the language model was built on the POS tags using the Berkeley LM from The University of California, Berkeley.

The metrics for evaluating the automated semantic token tagging system can include Precision, Recall and F1-score. The weighted average of the metrics of Precision, Recall and F1-score can be defined as:

$$\text{Weighted\_Precision} = \frac{\sum_{c \in C} \text{Precision}_c * |c|}{|C|} \quad (4)$$

$$\text{Weighted\_Recall} = \frac{\sum_{c \in C} \text{Recall}_c * |c|}{|C|}$$

$$\text{Weighted\_F1} = \frac{2 * \text{Weighted\_Precision} * \text{Weighted\_Recall}}{\text{Weighted\_Precision} + \text{Weighted\_Recall}}$$

With reference to Equation 4, c is an individual class and C represents all the classes; $\text{Precision}_c$ and $\text{Recall}_c$ are the precision and recall of class c respectively; |c| and |C| denote the number of test tokens of class c and all classes C respectively.

In this experimental embodiment, using a Keras python library, a two-layer GRU neural network with 150 and 75 hidden units respectively was trained. The activation method of tan h was selected for the two GRU layers and RMSprop as the optimizer. Two dropout rates: 0.6 for the two GRU layers and 0.3 for the embedding, i.e., adopting dropout on the word embeddings from Wikipedia, were implemented. The experiment shows that the best performance is achieved by using both dropouts. The word embedding had a dimension of 300 and the language model was an order of six.

The various parameters of the automated semantic tagging system can be determined by using the automatically generated data. Parameter tuning is conventionally done on a development set, which is a small dataset separated from the testing set. The automated semantic tagging system can reduce the need of using human annotated data for machine learning by adopting the automatically generated data for determining the parameters.

For purposes of this experiment, to determine the parameters, the automatically generated training data T was split into two subsets of equal size: T1 and T2. Different parameters can be set on the subset T1 and find the parameters that achieve the best weighted F1 score on T2. A single parameter can be tuned at a time (e.g., the optimizer for the neural network model) by using fixed values for the other parameters. The best parameters can be applied to the 100 annotated natural language questions from the legal domain.

TABLE 1

Evaluation Results

| Class | |Token| | Tagging | | |
| --- | --- | --- | --- | --- |
| | | P | R | F1 |
| Overall | 1,116 | 80 | 79 | 80 |
| c#Case | 98 | 84 | 100 | 91 |
| e#attorney | 114 | 75 | 88 | 81 |
| e#court | 171 | 84 | 91 | 87 |
| e#judge | 85 | 83 | 78 | 80 |
| e#jurisdiction | 179 | 99 | 84 | 91 |
| e#law_firm | 55 | 63 | 95 | 75 |
| e#party_name | 49 | 71 | 51 | 60 |
| e#topic | 171 | 80 | 80 | 80 |
| p#involving | 12 | 0 | 0 | 0 |
| p#presided | 33 | 69 | 55 | 61 |
| p#represented | 41 | 53 | 78 | 63 |
| p#topic | 62 | 83 | 32 | 47 |
| p#tried_in | 46 | 68 | 74 | 71 |

Table 1 demonstrates the evaluation results of each individual class. A class can start with three different tags: "p#", "e#" or "c#", representing predicate, entity and type classes respectively.

The embodiment of the automated semantic tagging system as implemented in the experiment, achieved higher F1 scores for type and entity classes than the predicate classes. This can be explained by the fact that the same or similar verbalization can be used to represent different predicates. For instance, although the following two questions "cases about Company A" and "legal cases about age discrimination" share the same predicate verbalization "about", it actually represents "p#involving" (i.e., a legal cases involves a specific company) and "p#topic" (i.e., a legal case is about a specific legal topic) respectively in these two questions. This may also happen between other predicates, such as "cases by John Smith" where "John Smith" is an attorney, i.e., "p#represented" and "cases by Andrew Anderson" where "Andrew Anderson" is a judge, i.e., "p#presided".

As mentioned above, by varying θ in Algorithm 1, different amounts of sequence variations can be selected. By employing too few or too many variations for training, either the training data does not sufficiently cover the different ways users may ask the same questions or too much noise is incurred in the training data, i.e., sequence variations that users typically do not use when asking natural language questions.

As mentioned above, in the experimental embodiment, two dropouts were applied in the automated semantic tagging system: on the embeddings (D-E) and on the GRU layers (D-G). When generating the training data, transformed sequence variations can be filtered using a language model. Therefore, when trained on such filtered data, the model may be overfitting to the training data. By employing the two dropouts, the overfitting problem can be mitigated. The two dropout rates can be varied depending on different domains.

Figure 3:
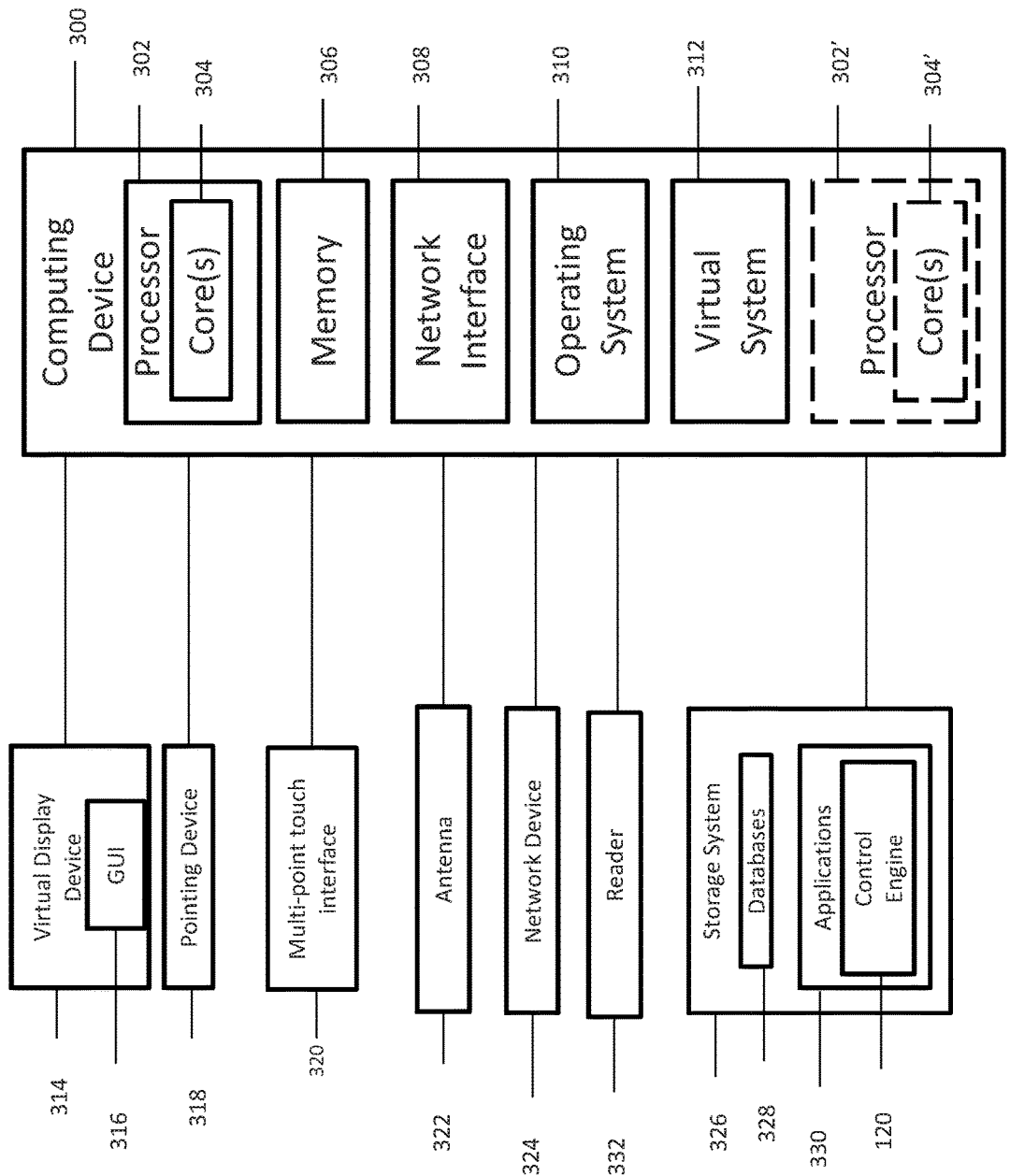
FIG. 3 is a block diagram illustrating an exemplary computing device in accordance with an exemplary embodiment.

FIG. 3 is a block diagram of an example computing device for implementing exemplary embodiments. The computing device 300 may be, but is not limited to, a smartphone, laptop, tablet, desktop computer, server or network appliance. The computing device 300 can be embodied as part of the computing system and/or domain. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the control engine 120) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 314, such as a computer monitor, which may display one or more graphical user interfaces 316, multi touch interface 320, a pointing device 318, a scanner 336 and a reader 332. The scanner 336 and reader 332 can be configured to read sensitive data.

The computing device 300 may also include one or more storage devices 326, such as a hard-drive, CD-ROM, or other computer readable media, for storing data and computer-readable instructions and/or software that implement exemplary embodiments (e.g., applications the control engine 120). For example, exemplary storage device 326 can include one or more databases 328 for storing information regarding domain specific data sets and knowledge graphs. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run operating system 310, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
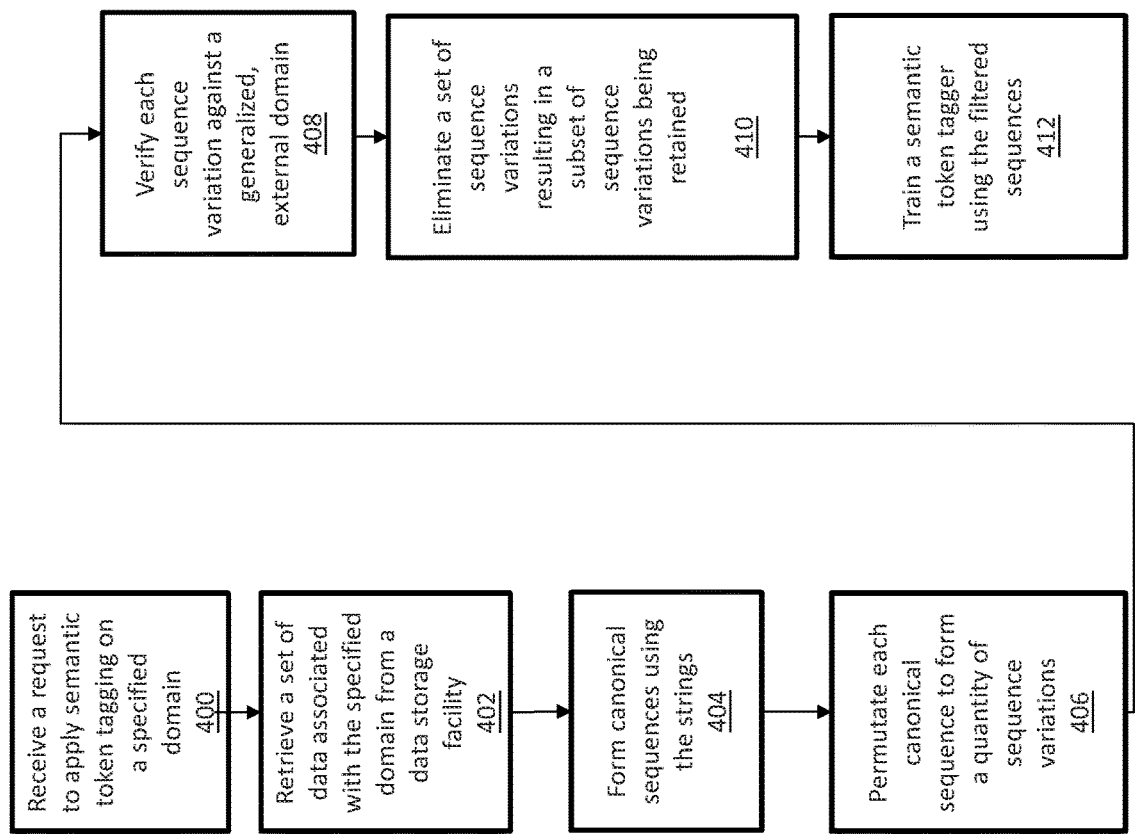
FIG. 4 is a flowchart illustrating an exemplary process performed in an automatic semantic token tagging system according to an exemplary embodiment.

FIG. 4 is a flowchart illustrating an exemplary process performed in an embodiment of the automated semantic token tagging system. In operation 400, a computing system (e.g., computing system 100 as shown in FIG. 1) can receive a request to apply semantic token tagging on a specified domain. In operation 402, the computing system can retrieve a knowledge graph from a knowledge graph database (e.g. knowledge graph database 130 as shown in FIG. 1) containing a set of data associated with the specified domain from a data storage facility. The set of data can include a quantity of distinct alphanumeric strings. In operation 404, the computing system can form canonical sequences using the strings. In operation 406, the computing system can permutate each canonical sequence to form a quantity of sequence variations. In operation 408, the computing system can verify each sequence variation against a generalized, external domain. In operation 410, the computing system can eliminate a set of sequence variations in response to failing to verify the set of sequence variations against the external domain, resulting in a subset of sequence variations being retained. In operation 412, the computing system can train a semantic token tagger to the specified domain using the subset of sequence variations as training data.

FIG. 5 is a flowchart illustrating an exemplary process performed in an embodiment of the automated semantic token tagging system. In operation 500, a computing system (e.g., computing system 100 as shown in FIG. 1) can train a sematic token tagger (e.g., token tagger 121 as shown in FIG. 1) using filtered sequences (generated as described above). In operation 502, an NLP-based application (e.g., application 170 as shown in FIG. 1) associated with a specified domain, can receive a natural language-based request (from a user) associated with the domain. In operation 504, the application can identify the subject, entity and predicate/verb of the query using the semantic token tagger trained by using data from this domain. In operation 506, the application can convert the request into one or more queries and can execute the one or more queries based on the identified subject, entity and predicate/verb. In operation 508, the application can retrieve the results of the executed query from a domain database (e.g. domain databases 140 as shown in FIG. 1) and present the results to the user. By using the token tagger that is trained on the automatically generated training data as described herein can improve and enhance the accuracy of the NLP-based application to facilitate the retrieval of appropriate, relevant, meaningful, and/or accurate data corresponding to the natural language-based request.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present invention. Further still, other aspects, functions and advantages such as different combinations of the described embodiments are also within the scope of the present invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. An automatic semantic token tagging method, the method comprising:
    retrieving a set of data associated with a specified domain from a data storage facility, the set of data including a plurality of strings;
    forming one or more canonical sequences from the plurality of strings;
    permutating each one or more canonical sequences to form a plurality of sequence variations;
    verifying each sequence variation of the plurality of sequence variations against a general domain;
    eliminating a set of sequence variations from the plurality of sequence variations, in response to failing to verify the set of sequence variations against the general domain, resulting in a subset of sequence variations; and
    training a semantic token tagger for the specified domain using the subset of sequence variations as training data.

2. The method of claim 1, wherein each of the one or more canonical sequences is made up of a plurality of segments.

3. The method of claim 2, wherein the plurality of segments include one or more of a subject, a predicate or verb, and an entity.

4. The method of claim 2, further comprising executing in-segment transformations on each of the plurality of segments to generate a plurality of permutations of each of the plurality of segments.

5. The method of claim 4, further comprising forming the plurality of sequence variations by permutating the one or more canonical sequences across the plurality of segments of the one or more canonical sequences based on the plurality of permutations.

6. The method of claim 1, wherein the plurality of strings are generated using a knowledge graph associated with the specified domain.

7. The method of claim 1, further comprising:
    performing Part-of-Speech (POS) tagging on the general domain;
    building a language model based on the POS tags.

8. The method of claim 7, wherein verifying each sequence variation of the plurality of sequence variations against the external domain comprises applying the language model on each sequence variation of the plurality of sequence variations.

9. The method of claim 1, wherein a machine learning architecture is used to build the semantic token tagger.

10. The method of claim 1, wherein the machine learning architecture is one or more of Maximum Entropy (MaxEnt), Conditional Random Fields (CRF), Long Short Term Memory (LSTM), Gated Recurrent Unit (GRU), and Convolutional Neural Network (CNN).

11. An automatic semantic token tagging system, the system comprising:
    a data storage facility configured to store data including a plurality of strings, associated with a plurality of domains;
    a computing system in communication with the data storage facility, the computing system configured to:
    retrieve, from the data storage facility, a set of data associated with a specified domain of the plurality of domains, the set of data including a plurality of strings;
    form one or more canonical sequence with the plurality of strings;
    permutate each of the one or more canonical sequence to form a plurality of sequence variations;
    verify each sequence variation of the plurality of sequence variations against a general domain;
    eliminate a set of sequence variations from the plurality of sequence variations in response to failing to verify the set of sequence variations against the general domain, resulting in a subset of sequence variations; and
    train a semantic token tagger for the specified domain using the subset of sequence variations as training data.

12. The system of claim 11, wherein each of the canonical sequences is made up of a plurality of segments.

13. The system of claim 12, wherein the plurality of segments include one or more of a subject, a predicate or verb, and an entity.

14. The system of claim 12, wherein the computing system is further configured to execute in-segment transformations on each segment of the plurality of segments, to generate a plurality of permutations of each segment.

15. The system of claim 14, wherein the computing system is further configured to form the plurality of sequence variations by permutating the one or more canonical sequences across the plurality of segments of the one or more canonical sequences based on the plurality of permutations.

16. The system of claim 11, wherein the plurality of strings are generated using a knowledge graph associated with the specified domain.

17. The system of claim 11, wherein the computing system is further configured to:
    perform Part-of-Speech (POS) tagging on the general domain; and
    build a language model based on the POS tags.

18. The system of claim 17, wherein the computing system is further configured to verify each sequence variation the plurality of sequence variations against the general domain, by applying the language model on each sequence variation of the plurality of sequence variations.

19. The system of claim 11, wherein machine learning is used to train the semantic token tagger.

20. The system of claim 11, wherein the machine learning architecture is one or more of Maximum Entropy (MaxEnt), Conditional Random Fields (CRF), Long Short Term Memory (LSTM), Gated Recurrent Unit (GRU), and Convolutional Neural Network (CNN).

21. A non-transitory computer readable memory medium storing instructions, wherein the instructions are executable by a processor to:
  retrieve a set of data associated with a specified domain from a data storage facility, the set of data including a plurality of strings;
  form one or more canonical sequence from the plurality of strings;
  permutate each of the one or more canonical sequence to form a plurality of sequence variations of each string;
  verify each sequence variation of the plurality of sequence variations against a general domain;
  eliminate a set of sequence variations from the plurality of sequence variations in response to failing to verify the set of sequence variations against the general domain, resulting in a subset of sequence variations; and
  train a semantic token tagger for the specified domain using the subset of sequence variations as training data.

* * * * *